United States Patent [19]

Coker, Jr.

[11] 4,097,434

[45] Jun. 27, 1978

[54] ADHESIVE COMPOSITION

[75] Inventor: George T. Coker, Jr., Houston, Tex.

[73] Assignee: Shell Oil Company, Houston, Tex.

[21] Appl. No.: 719,494

[22] Filed: Sep. 1, 1976

Related U.S. Application Data

[63] Continuation of Ser. No. 673,517, Apr. 5, 1976, abandoned.

[51] Int. Cl.$^2$ ............................................. C08L 93/00
[52] U.S. Cl. .............................. 260/23.3; 260/27 BB; 260/33.6 AQ; 260/33.6 UA; 260/33.6 PQ
[58] Field of Search ............. 260/27 BB, 5, 33.6 AQ, 260/33.6 UA, 33.6 PQ, 23.3; 252/8.05

[56] References Cited

U.S. PATENT DOCUMENTS

| | | | |
|---|---|---|---|
| 3,239,478 | 3/1966 | Harlan, Jr. | 428/290 |
| 3,427,269 | 2/1969 | Davis et al. | 156/334 |
| 3,514,395 | 5/1970 | McVay et al. | 260/33.6 AQ |
| 3,625,752 | 12/1971 | Korpman | 260/27 BB |
| 3,635,861 | 1/1972 | Russell | 260/829 |
| 3,706,653 | 12/1972 | Mills et al. | 260/33.6 AQ |
| 3,917,607 | 11/1975 | Crossland et al. | 260/27 BB |
| 3,954,692 | 5/1976 | Downey | 260/33.6 AQ |
| 4,001,167 | 1/1977 | Tungseth et al. | 260/27 BB |

*Primary Examiner*—Melvyn I. Marquis
*Attorney, Agent, or Firm*—Dean F. Vance

[57] ABSTRACT

An adhesive composition, a pressure sensitive adhesive tape or label, and a process to bond a porous substrate are disclosed wherein the adhesive composition employed comprises a thermoplastic elastomeric block polymer, a tackifying resin, and a low saturates content oil.

4 Claims, 1 Drawing Figure

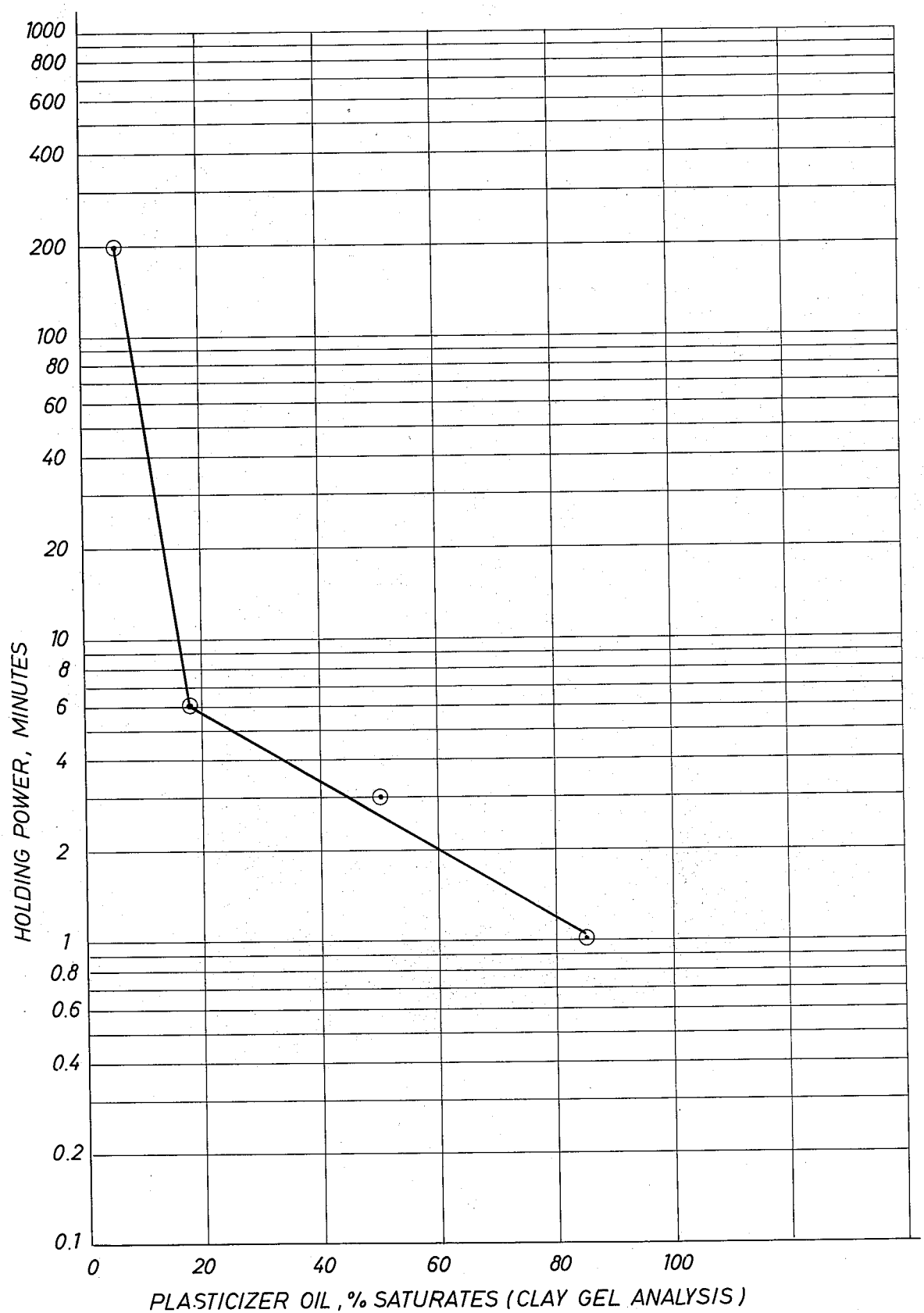

ADHESIVE COMPOSITION

This is a continuation of application Ser. No. 673,517, filed Apr. 5, 1976 and now abandoned.

BACKGROUND OF THE INVENTION

Block copolymers have been formulated in the past to produce a number of types of adhesive compositions. The basic patent in this field, Harlan, U.S. Pat. No. 3,239,478, shows combinations of block copolymers with tackifying resins and paraffinic extending oils to produce a wide spectrum of adhesives. It is particularly advantageous to employ extending oils in the adhesive composition since extending oils are less expensive than the block copolymers, and therefore, the use of extending oils results in lower cost adhesive compositions. In addition, extending oils typically improve the tack of the adhesive. Further, since there are many advantages to hot-melt adhesives as compared to solution applied adhesives, it is important that viscosity-reducing components, such as extending oils, be present. For example, Korpman, U.S. Pat. No. 3,676,202, describes a two component blend of certain block copolymers with a particular type of tackifying resin. However, the compositions described by Korpman are clearly oil-free and consequently would be difficult to apply to a tape backing in the form of a melt.

It has now been found that a standard adhesive composition comprising a block copolymer, tackifying resin, and paraffinic extending oil does not have adequate adhesion to porous substrates such as paper and cardboard. While it is known that the adhesion to cardboard can be improved by eliminating the extending oil as in Korpman, this is not a preferred approach to solving the problem.

In the past, it has been the accepted rule that the extending oil contain less than about 50%, preferably less than about 30% aromatic hydrocarbons. See U.S. Pat. No. 3,239,478; U.S. Pat. No. 3,427,269; and U.S. Pat. No. 3,917,607. Even in Russell, U.S. Pat. No. 3,635,861, which broadly states that the oil may range from paraffinic through napthenic to highly aromatic, the only oils employed in the working examples are highly paraffinic oils. The reason given in the past for limiting the aromatic content of the extending oils was that highly aromatic extending oil would associate with the polystyrene "domains" present in these thermoplastic elastomeric block copolymers, therein weakening the particular structure of the block copolymer that has been the most desired characteristic of these block copolymers. In other words, it was thought that highly aromatic extending oils would drastically reduce the inherently high cohesive strength of the adhesive composition. See Legge et al, Chemistry and Technology of Block Polymers, *Applied Polymer Science*, ACS, page 422 (1975, Craver and Tess ed.).

It has now been found that a particular extending oil having a relatively low saturates content can be employed in adhesive compositions and can be very useful in bonding porous substrates.

SUMMARY OF THE INVENTION

The present invention comprises an adhesive composition which has commercially acceptable tack when used with either porous or non-porous substrates. Specifically, the adhesive composition of the present invention comprises:

(a) 100 parts by weight of a block copolymer having at least two monoalkenyl arene polymer blocks A and at least one elastomeric conjugated diene blocks B, said blocks A comprising 8–55% by weight of the copolymer;

(b) about 50 to about 200 parts by weight of a tackifying resin compatible with block B; and (c) about 10 to about 100 parts by weight of a plasticizer having a saturates content of less than about 15% by weight, said plasticizer being a rubber compounding oil.

As shown in the following illustrative embodiments, the saturates content of the specific plasticizer employed herein is very critical. FIG. 1 reveals that at a plasticizer saturates level of less than 15%, the holding power increases dramatically to levels that are commercially acceptable. This finding is particularly surprising in view of the prevalent prior art practice of employing only those plasticizers having a saturates content of over about 50%.

DETAILED DESCRIPTION OF THE INVENTION

The block copolymers employed in the present composition are thermoplastic elastomers and have at least two monoalkenyl arene polymer end blocks A and at least one elastomeric conjugated diene polymer mid blocks B. The number of blocks in the block copolymer is not of special importance and the macromolecular configuration may be linear, graft or radial depending upon the method by which the block copolymer is formed. Typical block copolymers of the most simple configuration would have the structure polystyrene-polyisoprene-polystyrene and polystyrene-polybutadiene-polystyrene. A typical radial polymer would comprise one in which the diene block has three or more branches, the tip of each branch being connected to a polystyrene block. Other useful monoalkenyl arenes from which the thermoplastic (non-elastomeric) blocks may be formed include alphamethyl styrene, tert-butyl styrene and other ring alkylated styrenes as well as mixtures of the same. The conjugated diene monomer preferably has 4 to 5 carbon atoms, such as butadiene and isoprene. A much preferred conjugated diene is isoprene.

The average molecular weights of each of the blocks may be varied as desired. The monoalkenyl arene polymer blocks preferably have average molecular weights between about 5,000 and 125,000, more preferably between about 15,000 and about 100,000. The elastomeric conjugated diene polymer blocks preferably have average molecular weights between about 15,000 and about 250,000, more preferably between about 25,000 and about 150,000. The average molecular weights of the polystyrene end blocks are determined by gel permeation chromatography, whereas the polystyrene content of the polymer is measured by infrared spectroscopy of the finished block polymer. The weight percentage of the thermoplastic monoalkenyl arene blocks in the finished block polymer should be between about 8 and 55%, preferably between about 10% and about 30% by weight. The general type and preparation of these block copolymers are described in U.S. Pat. No. Re. 28,246 and in many other U.S. and foreign patents.

The block copolymers useful in the compositions of this invention may also be hydrogenated either selectively, randomly or completely. Selected conditions may be employed, for example, to hydrogenate the elastomeric diene center block while not so modifying the monoalkenyl arene polymer blocks. Two examples of hydrogenated polymers are polyvinylcyclohexane-hydrogenated polyisoprene-polyvinylcyclohexane and polystyrene-hydrogenated polyisoprene-polystyrene. Preferably, blocks A are characterized in that no more than about 25% of the original aromatic double bonds are reduced by hydrogenation while blocks B are characterized by having at least 75% of the aliphatic double bonds reduced by hydrogenation. See generally U.S. Pat. No. 3,595,942.

The block copolymer by itself is not tacky or sticky. Therefore, it is necessary to add a tackifying resin that is compatible with the elastomeric conjugated diene block. A much preferred tackifying resin is a diene-olefin copolymer of piperylene and 2-methyl-2-butene having a softening point of about 95° C. This resin is available commercially under the tradename Wingtack 95, and is prepared by the cationic polymerization of 60% piperylene, 10% isoprene, 5% cyclopentadiene, 15% 2-methyl butene and about 10% dimer. See South African Pat. No. 700,881. Other tackifying resins of the same general type may be employed in which the resinous copolymer comprises 20–80 weight percent of piperylene and 80–20 weight percent of 2-methyl-2-butene. The resins normally have softening points (ring and ball) between about 80° C and about 115° C. Other tackifying resins which are also useful in the compositions of this invention include hydrogenated resins, esters of resin, polyterpenes, terpenephenol resins, and polymerized mixed olefins.

The amount of tackifying resin employed varies from about 50 to about 200 parts per hundred rubber (phr), preferably, between about 50 and about 150 phr.

The composition, specifically the saturates content, of the plasticizer employed is critical to the present invention. A plasticizer is defined in the Condensed Chemical Dictionary, 8th Edition, Van Nostrand Reinhold Company, New York, page 699 (Hawley, 1971) as:

"An organic compound added to a high polymer both to facilitate processing and to increase the flexibility and toughness of the final product by internal modification (solvation) of the polymer molecule. The latter is held together by secondary valence bonds; the plasticizer replaces some of these with plasticizer-to-polymer bonds thus aiding movement of the polymer chain segments".

As seen in FIG. 1 and the following illustrative embodiments, the saturates content of the plasticizer is very critical.

At saturates levels above 15% by weight, the adhesion of the composition to porous substrates is not commercially acceptable for masking tapes. A standard masking tape by which to base commercial acceptability has a cross-linked-natural rubber adhesive having a holding power of at least 35 minutes.

The saturates content of the plasticizer is determined by clay-gel analysis according to ASTM test D-2007. The clay-gel analysis also determines the percent by weight of asphaltenes, polar compounds, and aromatics. Preferably, the aromatics content of the plasticizer should be above about 55% and the combined polar compound plus aromatics content be above about 85%.

The plasticizers employed are rubber compounding oils. Rubber compounding or extending oils are well known in the art, and are typically lube oil extracts. For the present invention, these oils must have a saturates content of less than about 15% by weight and should, preferably, have a specific gravity of about 0.9 to about 1.1 and a viscosity at 212° F of about 80 to about 1,000 SSU. Commercially available rubber compounding oils of the foregoing description include SHELL DUTREX ® oils, particularly Nos. 739, 896, 898, and 957.

The amount of rubber compounding oil employed is also critical to the adhesive characteristics of the invention. The amount of oil varies from about 10 to about 100 phr, preferably about 40 to about 80 phr.

Optionally, a high softening point-arene block compatible resin may be employed. Compatibility is judged by the method disclosed in U.S. Pat. No. 3,917,607. By the use of a high softening point resin, it is possible to either increase the holding power of the adhesive at a fixed oil concentration or increase the amount of oil that can be added at a fixed holding power. In addition to compatibility, the high softening point resin should have a softening point above about 100° C, as determined by ASTM method E 28, using a ring and ball apparatus. Useful resins include coumarone-indene resins, vinyl toluene-alphamethylstyrene copolymers, and polyindene resins. Much preferred is a coumarone-indene resin. The amount of high softening point resin varies from about 10 to about 200 phr. As stated above, the amount of extending oil that can be employed typically increases as the amount of high softening point resin is increased.

The compositions of this invention may be modified with supplementary materials including pigments, fillers, and the like as well as stabilizers and oxidation inhibitors.

The adhesive compositions of the present invention may be prepared by either blending block copolymer, oil and tackifying resin in a solvent, such as toluene, and removing the solvent by a steam stripping operation or they may be prepared by merely mixing the components at an elevated temperature, e.g. at about 150° C. In addition, if desired, the adhesive compositions may be cured, for example, by known irradiation techniques.

A preferred use of the present formulation is in the preparation of pressure-sensitive adhesive tapes by a method such as that disclosed in U.S. Pat. No. 3,676,202 or in the manufacture of labels. The pressure-sensitive adhesive tape comprises a flexible backing sheet and a layer of the pressure-sensitive adhesive composition of the instant invention coated on one major surface of the backing sheet. The backing sheet may be a plastic film, paper or any other suitable material and the tape may include various other layers or coatings, such as primers, release coatings and the like, which are used in the manufacture of pressure-sensitive adhesive tapes.

One unique property of the present adhesive composition is its excellent adhesion to porous, as well as nonporous substrates. Typical porous substrates include cardboard, paper, foamed polyurethane, and foamed-open cell polystyrene.

The invention is further illustrated by means of the following illustrative embodiments, which are given for the purpose of illustration alone and are not meant to limit the invention to the particular reactants and amounts disclosed.

Various standard tests are employed to measure the adhesive and cohesive characteristics of the adhesive compositions. Among these tests are rolling ball tack, Pressure Sensitive Tape Council (PSTC) method, PSTC 6; Polykene Probe Tack, ASTM D-2979; 180° Peel, PSTC 1; quick stick, PSTC 5; and holding power to kraft, PSTC 7 (½ × ½ inch width 2 kg load).

In all embodiments, the block copolymer employed was Shell KRATON® thermoplastic rubber 1107, which is a polystyrene-polyisoprene-polystyrene linear copolymer. The tackifying resin employed was Wingtack 95 resin, a diene-olefin resin. In addition, 1 phr Butyl Zimate (zinc dibutyldithiocarbamate) was added as a stabilizer.

Illustrative Embodiment I

In Illustrative Embodiment I, various adhesive compositions, each having 100 parts Kraton 1107 rubber, 75 parts Wingtack 95, and 1 part Butyl Zimate, were formulated. The compounding oils employed were Shell SHELLFLEX® 371 and SHELL DUTREX® 739. Shellflex 371 is a paraffinic oil having a viscosity at 100° F of 420 SSU, a viscosity at 212° F of 53.1 SSU, a specific gravity at 60° F of about 0.9, and a clay-gel analysis of about 0.3% polar compounds, 15.5% aromatics, and 84.2% saturates. Dutrex 739 is an aromatic oil having a viscosity at 100° F of 15,800 SSU, a viscosity at 212° F of 99 SSU, a specific gravity at 60° F of 1.03, and a clay-gel analysis of about 18.0% polar compounds, 76.0% aromatics, and 6.0% saturates. A 1.5 mil film was cast from a toluene solution on mylar, and a number of tests were performed. The results, presented below in Table 1 show the improvement when employing a low saturates as opposed to a high saturates compounding oil.

Table 1

| Run No. | 1 | 2 | 3 | 4 | 5 | 6 | 7 |
|---|---|---|---|---|---|---|---|
| Formulation (parts by weight) | | | | | | | |
| KRATON® 1107 Rubber | 100 | 100 | 100 | 100 | 100 | 100 | 100 |
| Wingtack 95 | 75 | 75 | 75 | 75 | 75 | 75 | 75 |
| Butyl Zimate | 1 | 1 | 1 | 1 | 1 | 1 | 1 |
| SHELLFLEX® 371 | — | 12.5 | — | 25 | — | 50 | — |
| DUTREX® 739 | — | — | 12.5 | — | 25 | — | 50 |
| Adhesive Properties: | | | | | | | |
| Rolling Ball Tack, cm. | 1.5 | 0.8 | 0.8 | 0.7 | 1.1 | 1.3 | 0.5 |
| Polyken Probe Tack, Kg. | 1.1 | 0.7 | 0.9 | 0.7 | 0.8 | 0.6 | 0.8 |
| 180° Peel, pli. | 3.9 | 3.4 | 4.0 | 2.6 | 3.7 | 1.0 | 1.7 |
| Quick Stick, pli. | | | | | | | |
| Kraft | 0.8 | 0.9 | 1.0 | 0.9 | 0.9 | 0.7 | 0.8 |
| Steel | 3.3 | 3.5 | 4.4 | 2.7 | 4.0 | 1.0 | 2.9 |
| Holding Power, Kraft, min. | >2600 | 19 | >2700 | 9 | 1800 | 0 | 3 |

Illustrative Embodiment II

Illustrative Embodiment II was conducted in a similar manner to Illustrative Embodiment I except that 150 parts of Wingtack 95 were employed. The results are presented below in Table 2.

Table 2

| Run No. | 8 | 9 | 10 | 11 | 12 | 13 | 14 | 15 | 16 |
|---|---|---|---|---|---|---|---|---|---|
| Formulation (parts by weight) | | | | | | | | | |
| KRATON® 1107 Rubber | 100 | 100 | 100 | 100 | 100 | 100 | 100 | 100 | 100 |
| Wingtack 95 | 150 | 150 | 150 | 150 | 150 | 150 | 150 | 150 | 150 |
| Butyl Zimate | 1 | 1 | 1 | 1 | 1 | 1 | 1 | 1 | 1 |
| SHELLFLEX® 371 | — | 25 | — | 50 | — | 75 | — | 100 | — |
| BUTREX® 739 | — | — | 25 | — | 50 | — | 75 | 1 | 100 |
| Adhesive Properties: | | | | | | | | | |
| Rolling Ball Tack cm. | >30 | 1.0 | >30 | 0.5 | 1.4 | 0.7 | 0.6 | 0.6 | 0.7 |
| Polyken Probe Tack, Kg. | 1.1 | 1.7 | 1.6 | 1.1 | 1.7 | 1.8 | 1.7 | 0.6 | 1.2 |
| 180° Peel, pli. | 4.8 | 4.6 | 6.0 | 4.6 | 6.1 | 2.3 | 6.3 | 1.7 | 5.4 |
| Quick Stick, pli. | | | | | | | | | |
| Kraft | 0 | 1.3 | 0.7 | 1.3 | 0.7 | 1.0 | 0.7 | 1.3 | 0.9 |
| Steel | 1.6 | 4–6 | 2.1 | 2.6 | 4.3 | 2.4 | 5.0 | 2.4 | 5.1 |
| Holding Power, Kraft, min. | 300 | 200 | 450 | 8 | 100 | 1 | 12 | <1 | 7 |

Illustrative Embodiment III

In Illustrative Embodiment III, varying amounts of tackifying resin and compounding oil were employed. The results are presented below in Tables 3, 4 and 5. In all runs, the adhesive was cast from a toluene solution on mylar film at 1.5 mil dry thickness, air dried 1 hour, followed by drying at 104° F with 24 inches of vacuum.

Table 3

| Run No. | 17 | 18 | 19 | 20 | 21 | 22 | 23 |
|---|---|---|---|---|---|---|---|
| Formulation (parts by weight) | | | | | | | |
| KRATON® 1107 Rubber | 100 | 100 | 100 | 100 | 100 | 100 | 100 |
| Butyl Zimate Stabilizer | 1 | 1 | 1 | 1 | 1 | 1 | 1 |
| Wingtack 95 Resin | 150 | 150 | 150 | 150 | 150 | 150 | 150 |
| Dutrex Oil 739 | 0 | 12.5 | 25 | 25 | 50 | 75 | 100 |
| Adhesive Properties: | | | | | | | |
| Rolling Ball Tack, cm. | 30+ | 30+ | 30+ | 11.5+ | 1.4 | .6 | .7 |
| Polyken Probe Tack, Kg. | 1.1 | 1.1 | 1.7 | 1.6 | 1.8 | 1.8 | 1.2 |
| 180° Peel, pli. | 4.8 | 4.9 | 6.0 | 7.9 | 6.1 | 6.3 | 5.4 |
| Holding Power to Kraft, min. | 302 | 1893 | 453 | 1016 | 99 | 12 | 7 |
| Quick Stick to Kraft, pli. | 0 | 0.7 | 0.7 | 0.7 | 0.7 | 0.7 | 0.7 |
| Quick Stick to Steel, pli. | 1.6 | 1.2 | 2.1 | 2.0 | 4.3 | 5.0 | 5.1 |

Table 4

| Run No. | 24 | 25 | 26 | 27 | 28 |
|---|---|---|---|---|---|
| Formulation (parts by weight) | | | | | |

Table 4-continued

| Run No. | 24 | 25 | 26 | 27 | 28 |
|---|---|---|---|---|---|
| KRATON® 1107 Rubber | 100 | 100 | 100 | 100 | 100 |
| Butyl Zimate Stabilizer | 1 | 1 | 1 | 1 | 1 |
| Wingtack 95 Resin | 100 | 100 | 100 | 100 | 100 |
| Dutrex Oil 739 | 0 | 12.5 | 25 | 50 | 100 |
| Adhesive Properties: | | | | | |
| Rolling Ball Tack, cm. | 30+ | 3.8 | 0.9 | 1.0 | .3 |
| Polyken Probe Tack, Kg. | 1.1 | 1.6 | 1.6 | 1.5 | 1.1 |
| 180° Peel, pli. | 2.8 | 5.1 | 4.9 | 4.1 | 2.6 |
| Holding Power to Kraft, min. | >5400 | 720 | 2826 | 55–66 | 5 |
| Quick Stick to Kraft, pli. | — | 1.0 | 1.0 | 1.0 | 1.0 |
| Quick Stick to Steel, pli. | 1.6 | 3.8 | 5.2 | 4.2 | 2.9 |

Table 5

| Run No. | 29 | 30 | 31 | 32 | 33 |
|---|---|---|---|---|---|
| Formulation (parts by weight) | | | | | |
| KRATON® 1107 Rubber | 100 | 100 | 100 | 100 | 100 |
| Butyl Zimate Stabilizer | 1 | 1 | 1 | 1 | 1 |
| Wingtack 95 Resin | 75 | 75 | 75 | 75 | 75 |
| Dutrex Oil 739 | 0 | 12.5 | 25 | 50 | 100 |
| Adhesive Properties: | | | | | |
| Rolling Ball Tack, cm. | 1.6 | .8 | 1.1 | .5 | .6 |
| Polyken Probe Tack, Kg. | 1.1 | .9 | .8 | .8 | .7 |
| 180° Peel, pli. | 3.6 | 4.0 | 3.7 | 1.7 | 2.2 |
| Holding Power to Kraft, min. | >5000 | >2740 | 1815 | 3 | 4 |
| Quick Stick to Kraft, pli. | 0.8 | 1.0 | .9 | .8 | .8 |
| Quick Stick to Steel, pli. | 3.5 | 4.4 | 4.0 | 2.9 | 2.7 |

Illustrative Embodiment IV

In Illustrative Embodiment IV, various compounding oils were employed with a standard adhesive formulation comprising:

| Component | Tradename | Parts by Weight |
|---|---|---|
| Block copolymer | Kraton 1107 | 100 |
| Tackifying resin | Wingtack 95 | 100 |
| High softening point resin | Cumar LX 509 | 40 |
| Compounding oil | Shellflex 371<br>Shellflex 881<br>Dutrex 357<br>Dutrex 739 | 90 |
| Antioxidant-stabilizer | A.O. 2246 2,2 Methylenebis(4-Methyl-6-tertiarybutyl phenol) | 1 |
| | Weston 618 Distearyl pentaerythritol disphosphite | 1 |
| | Butyl Zimate | 2 |

Cumar LX 509 is a coumarone-indene resin having a softening point of about 145° C. The various formulations, along with the test results are presented below in Table 6, and are graphically presented in FIG. 1.

Table 6

| Run No. | 34 | 35 | 36 | 37 |
|---|---|---|---|---|
| Formulation | | | | |
| KRATON® 1107 Rubber | 100 | 100 | 100 | 100 |
| Wingtack 95 | 100 | 100 | 100 | 100 |
| Cumar LX 509 | 40 | 40 | 40 | 40 |
| Butyl Zimate | 2 | 2 | 2 | 2 |
| A.O. 2246 | 1 | 1 | 1 | 1 |
| Weston 618 | 1 | 1 | 1 | 1 |
| Oil type | Shellflex 371 | Shellflex 881 | Dutrex 357 | Dutrex 739 |
| amount | 90 | 90 | 90 | 90 |
| Molecular Analysis, clay-gel %w: | | | | |
| asphaltenes | 0 | 0 | 0 | 0 |
| polar compounds | 0.3 | 12.0 | 10.0 | 18.0 |
| aromatics | 15.5 | 37.3 | 71.9 | 76.0 |
| saturates | 84.2 | 50.7 | 18.1 | 6.0 |
| viscosity, SSU/212° F | 53.1 | 247 | 48.4 | 99.0 |
| specific gravity/60° F | 0.90 | 0.92 | 1.00 | 1.03 |
| Adhesive Properties: | | | | |
| Holding Power to Kraft, min. | 1 | 29 | 60 | 200 |
| Quick Stick to Steel, pli. | 1.6 | 2.4 | 1.9 | 3.0 |
| Quick Stick to Kraft, pli | 0.7 | — | — | 0.7 |
| Rolling Ball Tack, cm. | 1.2 | 1.0 | 0.9 | 1.2 |
| Polyken Probe Tack, Kg. | 0.7 | 1.15 | 0.85 | 1.4 |
| 180° Peel | 1.9 | 3.4 | 2.2 | 3.7 |

What is claimed is:

1. An adhesive composition comprising:
   (a) 100 parts by weight of a block copolymer having at least two monoalkenyl arene polymer end blocks A and at least one elastomeric conjugated diene mid block B, said blocks A comprising 10–30% by weight of the copolymer;
   (b) about 50 to about 200 parts by weight of a tackifying resin compatible with block B; and
   (c) about 10 to about 100 parts by weight of a rubber compound oil plasticizer having a saturates content of less than about 15% by weight, an aromatics content of above about 55% by weight, a specific gravity of 0.9 to 1.1 and a viscosity at 212° F of 80 to 1,000 SSU.

2. A composition according to claim 1 wherein said block copolymer is selectively hydrogenated such that no more than 25% of the aromatic double bonds of block A are reduced by hydrogenation while at least 75% of the aliphatic double bonds of block B are reduced by hydrogenation.

3. A composition according to claim 1 wherein said tackifying resin is selected from the group consisting of diene-olefin copolymers, hydrogenated resins, esters of resin, polyterpenes, terpenephenol resins, and polymerized mixed olefins.

4. A composition according to claim 1 including between about 10 and about 200 parts by weight of a high softening point resin compatible with block A, said high softening point resin being selected from the group consisting of coumaroneindene resins, vinyl toluene-alphamethyl styrene copolymers and polyindene resins.

* * * * *